United States Patent
Kang et al.

(10) Patent No.: US 8,220,059 B2
(45) Date of Patent: Jul. 10, 2012

(54) METHOD AND APPARATUS FOR GENERATING RIGHTS OBJECT BY REAUTHORIZATION

(75) Inventors: Bo-gyeong Kang, Seoul (KR); Jae-won Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 914 days.

(21) Appl. No.: 11/715,948

(22) Filed: Mar. 9, 2007

(65) Prior Publication Data

US 2008/0060053 A1 Mar. 6, 2008

(30) Foreign Application Priority Data

Sep. 4, 2006 (KR) .................. 10-2006-0084827

(51) Int. Cl.
  *G06F 7/04* (2006.01)
(52) U.S. Cl. ........................ 726/26; 705/903
(58) Field of Classification Search ............ 726/26–33, 726/34; 705/57, 59, 901, 902, 903, 904, 705/911

See application file for complete search history.

(56) References Cited

U.S. PATENT DOCUMENTS

| | | | |
|---|---|---|---|
| 5,586,260 A * | 12/1996 | Hu ............................. | 726/12 |
| 6,643,774 B1 * | 11/2003 | McGarvey ................ | 713/155 |
| 7,487,535 B1 * | 2/2009 | Isaacson et al. .......... | 726/4 |
| 7,962,424 B1 * | 6/2011 | Colosso et al. ........... | 705/50 |
| 7,987,142 B2 * | 7/2011 | Malackowski et al. .... | 705/50 |
| 8,112,361 B2 * | 2/2012 | Golan et al. .............. | 705/54 |
| 2002/0184517 A1 * | 12/2002 | Tadayon et al. .......... | 713/200 |
| 2003/0028773 A1 * | 2/2003 | McGarvey et al. ........ | 713/176 |
| 2004/0083359 A1 * | 4/2004 | Camus et al. ............. | 713/156 |
| 2004/0249815 A1 * | 12/2004 | Lee ........................... | 707/9 |
| 2005/0044361 A1 * | 2/2005 | Chang et al. ............. | 713/167 |
| 2005/0138357 A1 * | 6/2005 | Swenson et al. .......... | 713/155 |
| 2006/0101521 A1 * | 5/2006 | Rabinovitch .............. | 726/26 |
| 2006/0259770 A1 * | 11/2006 | Peinado .................... | 713/171 |
| 2007/0112676 A1 * | 5/2007 | Kontio et al. ............. | 705/50 |
| 2007/0168293 A1 * | 7/2007 | Medvinsky ............... | 705/57 |
| 2007/0192836 A1 * | 8/2007 | Shiran et al. ............. | 726/4 |
| 2008/0005034 A1 * | 1/2008 | Kravitz et al. ............ | 705/59 |

FOREIGN PATENT DOCUMENTS

| | | |
|---|---|---|
| JP | 2000-076194 A | 3/2000 |
| KR | 10-2005-0020165 A | 3/2005 |
| KR | 10-2006-0082230 A | 7/2006 |

OTHER PUBLICATIONS

Hwang et al, Modeling and implementation of digital rights, Dec. 30, 2003, Elsevier inc, p. 533-549.*
Notice of Allowance issued Feb. 18, 2008 from the Korean Intellectual Property Office in counterpart Korean application No. 10-2006-0084827.

* cited by examiner

*Primary Examiner* — Eleni Shiferaw
*Assistant Examiner* — Abu Sholeman
(74) *Attorney, Agent, or Firm* — Sughrue Mion, PLLC (57) ABSTRACT

Provided are a method and apparatus for generating a rights object (RO) by reauthorization. The method includes a second device mutually authenticating a first device, which received the first authorization information from a right issuer (RI), receiving a first RO from the first device, receiving a second authorization information from the first device, generating a third authorization information based on the second authorization information, changing the first RO to a second RO using the second authorization information, and transmitting the third authorization information and the second RO to an unauthorized device.

8 Claims, 8 Drawing Sheets

METHOD AND APPARATUS FOR GENERATING RIGHTS OBJECT BY REAUTHORIZATION

CROSS-REFERENCE TO RELATED PATENT APPLICATION

This application claims priority from Korean Patent Application No. 10-2006-0084827, filed on Sep. 4, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to content use using digital rights management (DRM), and more particularly, to generating a rights object (RO) by reauthorization.

2. Description of the Related Art

In a related art DRM system, a content provider or a right issuer (RI) encrypts and then transmits content in order to control the use of content. Also, an RO, including a usage rule of the corresponding content, is issued in order to protect the rights of an author. Accordingly, a DRM device is designed to forcibly follow the usage rule included in the RO.

Figure 1:
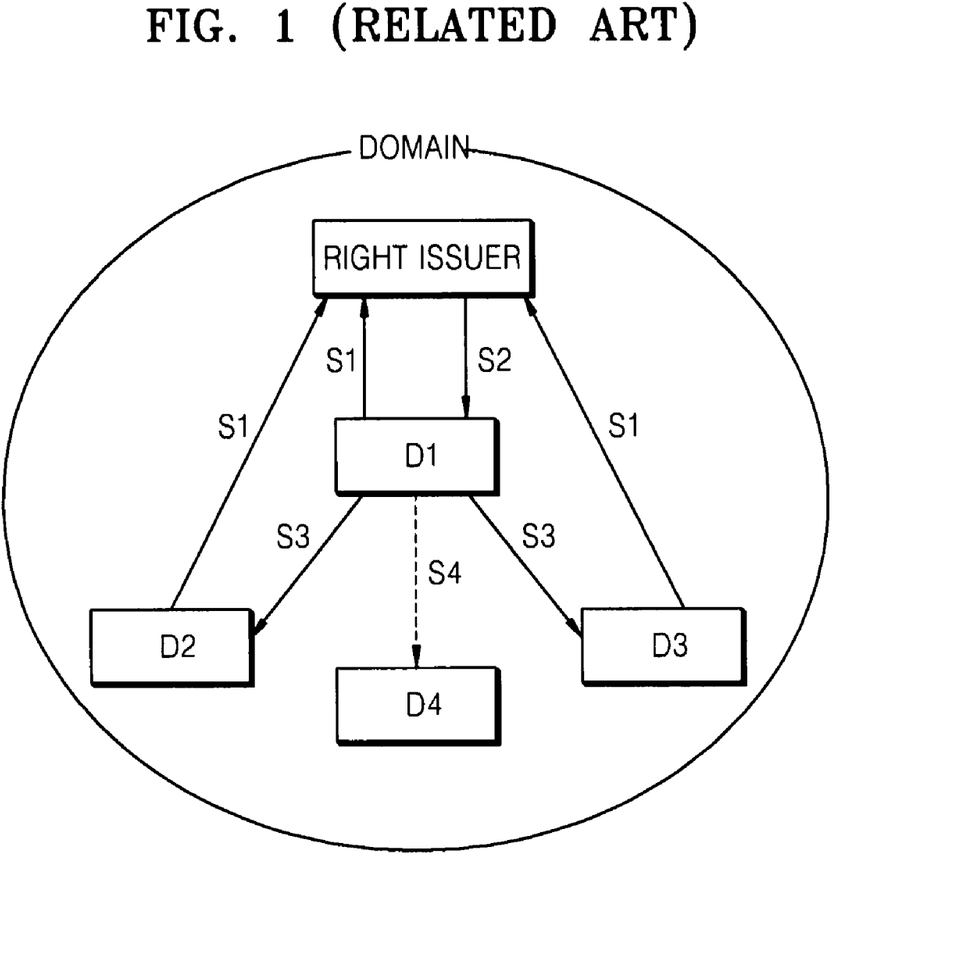
FIG. 1 is a diagram illustrating the generation and distribution of a RO of related art content.

FIG. 1 is a diagram illustrating the generation and distribution of an RO of related art content. Devices D1, D2, D3, and D4 inside a domain each undergo a registration procedure by the corresponding service provider in order to register as a member in the domain. Accordingly, the devices D1, D2, D3, and D4 can share content and an RO between other devices. Here, one representative device D1 can share content and the RO from the other devices with the remaining devices D2, D3, and D4 by transmitting the content and the RO. Then, the remaining devices D2, D3, and D4 rely on the received content and the RO, using information from the service provider, and use the received content and the RO.

A method of sharing rights information, i.e., an RO, of content using the domain is performed as shown in FIG. 1.

First, four devices are included in one domain and, in a domain technology based on a server, a content server includes a route certificate and a service provider certificate, for generating an encrypted content, a encryption key for using the encrypted content, and an RO including a usage rule. The route certificate is a certificate from a certificate issuer for checking an authorization system. The service provider certificate is a certificate in which a public key of the service provider is authorized by the certificate issuer.

Referring to FIG. 1, the devices D1, D2, and D3 are registered with the RI and participate in the domain in operation S1. The device D1 obtains content an RO from the RI in operation S2 and transmits the obtained content and RO to the devices D2 and D3 in operation S3. Meanwhile, even when the device D1 transmits the contents and RO to the device D4 in operation S4, since the device D4 has not yet been registered with the RI, a process of registering with the RI and joining the domain is required.

Processes of generating the RO of the encrypted content will now be described in detail. The service provider generates the encrypted content and RO using a content packaging process. The RO includes a content encryption key (CEK), which encrypts the content, and a usage rule. While generating the RO, important information, such as the CEK, or the like, is encrypted using a key of the device D1, which requested the content. Accordingly, a key for deciphering the content can be obtained only by the device D1 using its own key, and thus, only the device D1 can use the content.

Also, the RO is signed by a private key and the device D1 confirms the signature of the RI using the route certificate owned by the device D1 itself. If the signature of the RI is incorrect, the device D1 is unable to use the corresponding RO.

Processes of using generated content and RO will now be described. In order for a device, which received the content and RO, to use the corresponding content, the device should check a signature of an RI on the received RO, decipher a rights encryption key (REK) of the RO, and decipher a CEK using the REK. Then, the content is deciphered using the CEK in order to use the content according to a usage rule owned by the RO.

As described above, in a re-distribution based on a server, the RO should be re-issued by the RI for the re-distribution.

Accordingly, when the content is re-distributed using a local domain manager, the following problems may occur. First, when the local domain manager changes a key included in the RO issued to itself, into a domain key in order to share the key with other devices inside the domain, the signature of the service provider is no longer effective. As a result, the service provider loses the authority to control the content changed by the local domain manager, and thus, unauthorized content can be distributed.

Second, the service provider is unable to determine a domain arbitrarily formed by the local domain manager, and is thus unable to determine in which domain content is used, which devices use the content, under what constraints is the content used, or the like.

Third, the devices (including a rendering device) in the domain should know a public key of the local domain manager in order to use the received content and RO, and should verify the validity of the certificate from the local domain manager every time. That is, when the local domain manager is hacked, unlimited re-distribution of the content may occur.

Moreover, in an Open Mobile Alliance (OMA) DRM environment, each device receives an RO, signed with a key of the RI, from the RI in order to be able to use the content. Accordingly, each device can authorize the received RO using the key of the RI that it owns itself. That is, all devices should have the key of the RI.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

An aspect of the present invention provides a mobile terminal for obtaining content required by a user, using a nearby terminal or a local server.

According to an aspect of the present invention, there is provided a method of generating an RO by reauthorization, the method including: a first device mutually authenticating a representative device, which received the first authorization information from an RI; receiving a first RO from the representative device; receiving a second authorization information from the representative device; generating a third authorization information based on the second authorization information; changing the first RO to a second RO using the second authorization information; and transmitting the third authorization information and the second RO to an unauthorized device.

The method may further include: a first device mutually authenticating the RI; receiving a third RO from the RI; receiving the first authorization information from the RI; and changing the third RO into the first RO using the first authorization information.

The representative device may be included in the same domain as the RI and the first device. The unauthorized device may not be included in the same domain as the first device.

The method may further include transmitting content, which can be used as the second RO, to the unauthorized device.

According to another aspect of the present invention, there is provided an apparatus for generating an RO by reauthorization, the apparatus including: a control unit which mutually authenticates a representative device, which received a first authorization information from an RI, and manages a first RO, received from the representative device; a reauthorization storage unit which stores a third authorization information generated based on a second authorization information received from the representative device; a rights object generation unit which changes the first RO to a second RO using the second authorization information; and a transceiver which transmits the third authorization information and the second RO to an unauthorized device.

According to another aspect of the present invention, there is provided an apparatus for generating an RO by reauthorization, the apparatus including: a control unit which mutually authenticates an RI and manages a first RO received from the RI; a reauthorization storage unit which stores a second authorization information generated based on a first authorization information received from the RI; a rights object generation unit which changes the first RO to a second RO using the first authorization information; and a transceiver which transmits the second authorization information and the second RO to the first device, wherein the first device is included in the same domain as the apparatus.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which exemplary embodiments of the invention are shown. In the drawings, like reference numerals denote like elements.

Figure 2:
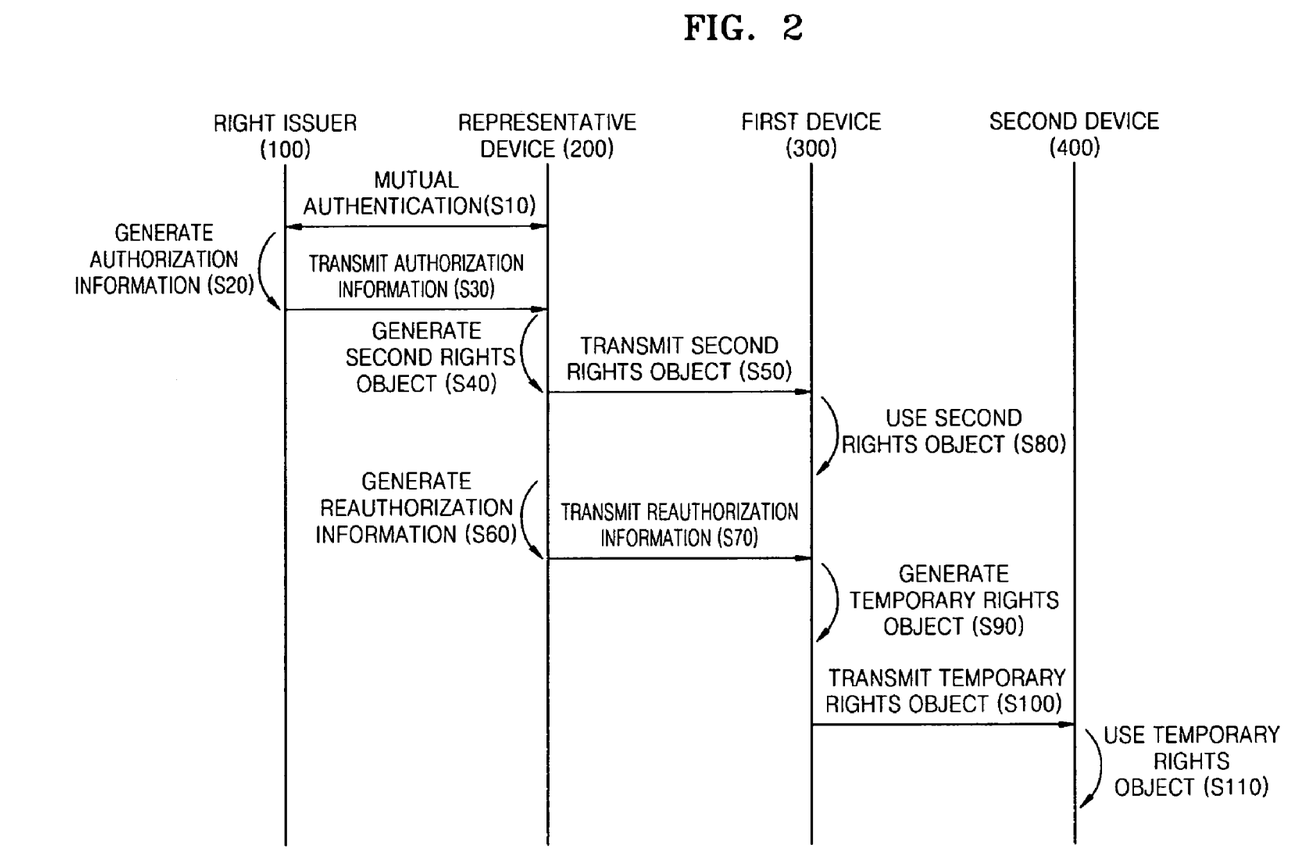
FIG. 2 is a flowchart illustrating a process of generating a temporary RO according to an exemplary embodiment of the present invention.

FIG. 2 is a flowchart illustrating a process of generating a temporary RO according to an exemplary embodiment of the present invention.

In the current exemplary embodiment, an RI 100 is included in the same domain as a representative device 200 and a first device 300, and a second device 400 is an external device, not included in the same domain.

Using the current exemplary embodiment as illustrated in FIG. 2, a certain user, having obtained predetermined content and an RO required for executing the predetermined content reproduces the rights object as a substitute RO, so that other devices can use the RO. In order to prevent an unauthorized reproduction of the substitute RO, the RI 100 may only allow a device, which is authorized with authorization information to generate a second RO. Accordingly, using the predetermined content is convenient and the predetermined content can be protected.

First, the RI 100 and the representative device 200 authenticate each other in operation S10. Then, after performing the authentication, the RI 100 generates authorization information in operation S20, and transmits the generated authorization information to the representative device 200 in operation S30. Here, the authorization information is information for verifying consent of the RI 100 when generating an RO.

Upon receiving the authorization information, the representative device 200 generates a second RO using the authorization information in operation S40, and transmits the generated second RO to the first device 300 in operation S50. The representative device 200 also generates reauthorization information, which reauthorizes the first device 300 to generate an RO, in operation S60, and transmits the generated reauthorization information to the first device 300 in operation S70.

The first device 300 uses the received second RO after authentication in operation S80, and generates a temporary RO using the received reauthorization information in operation S90. Then, the first device 300 transmits the generated temporary RO to the second device 400 in operation S100. Accordingly, the second device 400 uses the received temporary RO after authentication in operation S110.

The representative device 200 not only transmits the second RO to the first device 300, but also transmits the reauthorization information, which enables the generation and transmission of the temporary RO, to the second device 400, i.e., the external device. Accordingly, the second device 400 receives the temporary RO from the first device 300, and does not directly receive the temporary RO from the representative device 200.

Figure 3:
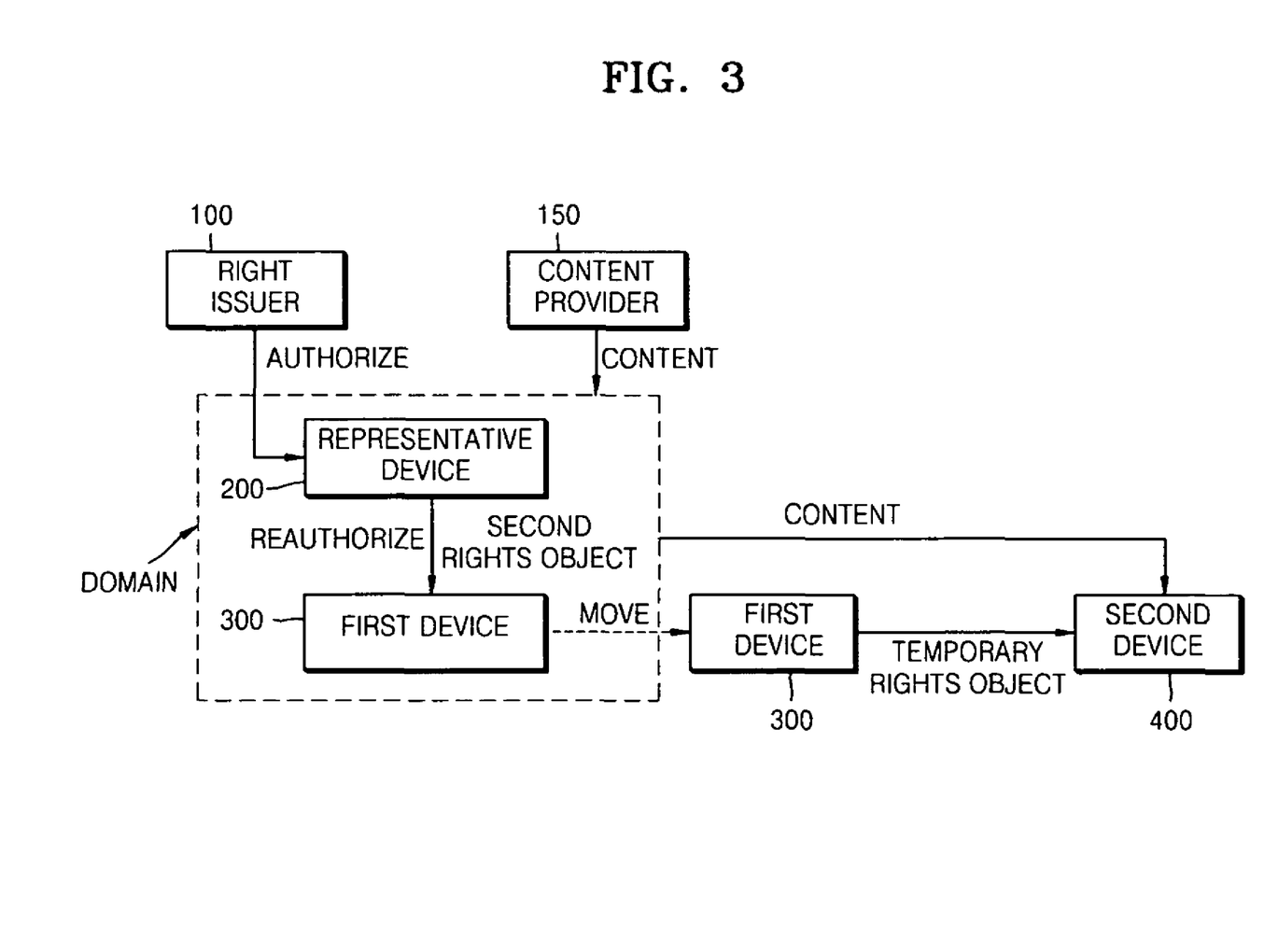
FIG. 3 is a diagram illustrating the generation of an RO according to an exemplary embodiment of the present invention.

FIG. 3 is a diagram illustrating the generation of an RO according to an exemplary embodiment of the present invention. As shown in FIG. 3, the RI 100 authorizes the representative device 200 to generate the second RO, and a content provider 150 transmits content to the representative device 200.

The representative device 200 reauthorizes the first device 300, included in the same home domain, in order to generate a temporary RO, while transmitting the content to the first device 300. The first device 300 generates the temporary RO and transmits the temporary RO to the second device 400, which is not included in the home domain. In other words, upon receiving the content and reauthorization information from the representative device 200, the first device 300 is moved to a domain outside the home domain by a user, and accordingly, the user transmits the content to the second device 400 through the first device 300 and resigns the temporary RO of the content using the reauthorization information. That is, the temporary RO is regenerated using the reauthorization information owned by the first device 300, and is transmitted to the second device 400.

Figure 4:
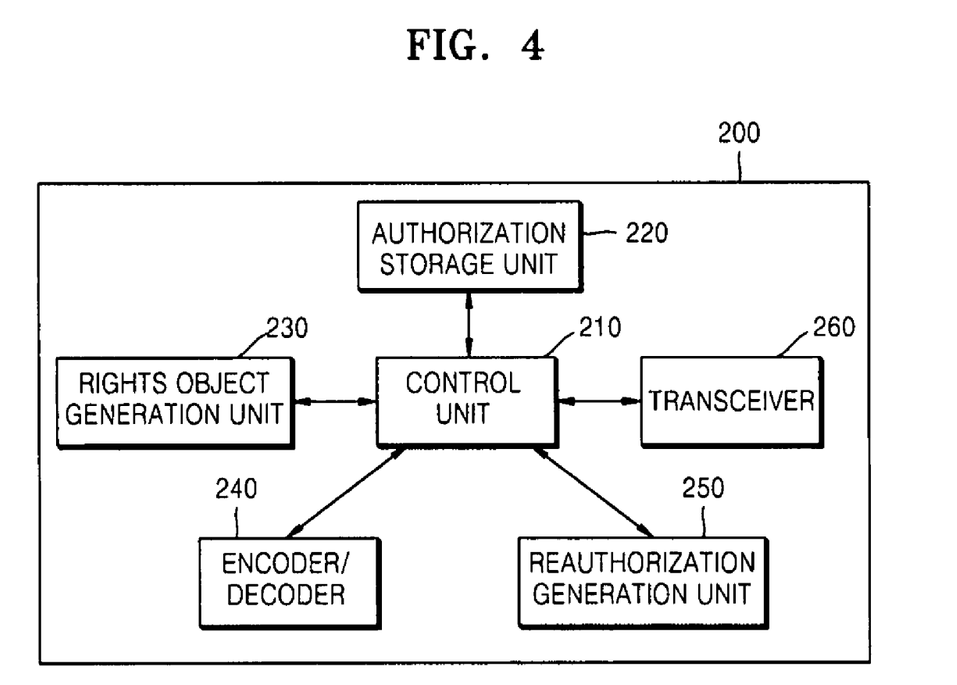
FIG. 4 is a block diagram illustrating a representative device according to an exemplary embodiment of the present invention.

FIG. 4 is a block diagram illustrating the representative device 200 according to an exemplary embodiment of the present invention. As shown in FIG. 4, the representative device 200 includes a control unit 210, an authorization storage unit 220, a RO generation unit 230, an encoder/decoder 240, a reauthorization generation unit 250, and a transceiver 260. The control unit 210 performs an authentication on the RI 100 and manages the RO received from the RI 100.

Figure 5:
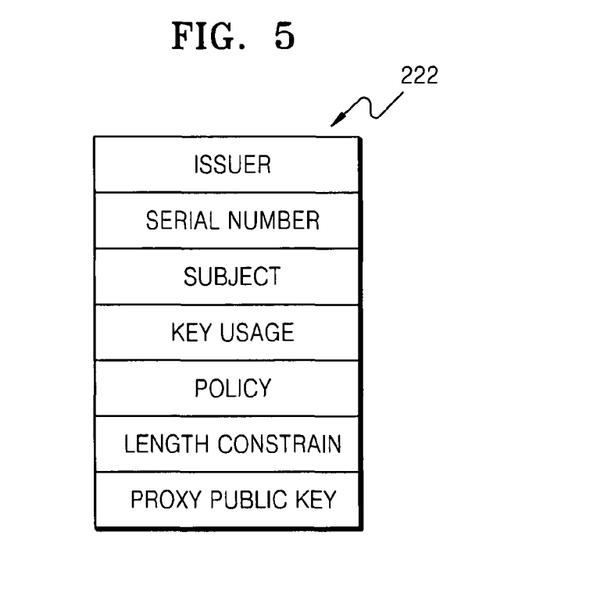
FIG. 5 is a diagram illustrating a proxy certificate according to an exemplary embodiment of the present invention.

The authorization storage unit 220 stores a proxy certificate 222, illustrated in FIG. 5, which is received from the RI 100. That is, the representative device 200 generates pairs of new proxy public keys e and N and private keys d and N, which are different from its existing public key and private key, and stores the proxy certificate 222, obtained from the RI 100, in the authorization storage unit 220.

FIG. 5 is a diagram illustrating the proxy certificate 222 according to an exemplary embodiment of the present invention. As shown in FIG. 5, the proxy certificate 222 includes information about an issuer showing the RI, a serial number about the RO, subject about the RO, and key usage. The proxy certificate 222 also includes policy showing limits on downloading time, number of download times, etc., of the content, length constraint showing limits on number of reauthorization times, and proxy public keys e and N for generating the RO. When a value of the length constraint on a chain which can be reauthorized is 3, the representative device 200 can reauthorize two devices which are connected in the form of a chain. That is, the representative device 200 reauthorizes the first device 300 to generate the RO, and the first device 300 reauthorizes the second device 400 to generate the RO.

The RO generating unit 230 changes the RO into the newly signed second RO using the authorization information received from the RI 100, so that other devices can use the RO, and stores the second RO.

The encoder/decoder 240 provides a function of encrypting the RO to the RO generating unit 230.

When the RI 100 reauthorizes the representative device 200, the reauthorization generation unit 250 generates authorization for generating the temporary RO inside the range of the given authorization, and transmits the authorization to the first device 300. Accordingly, the representative device 200 generates a reauthorization key v, derived from its own proxy private key, and transmits the reauthorization key v to the first device 300. That is, the representative device 200 generates the following reauthorization key v, using a warranty w about the reauthorization.

$$v = h(w, SN\_\text{first device})^{-d} \bmod N \qquad [\text{EQN. 1}]$$

Also, the representative device 200 transmits the generated reauthorization key v, the warranty w, and the proxy certificate 222 to the first device 300 using the transceiver 260.

The transceiver 260 exchanges information with the RI 100 or transmits the second RO to the first device 300.

Figure 6:
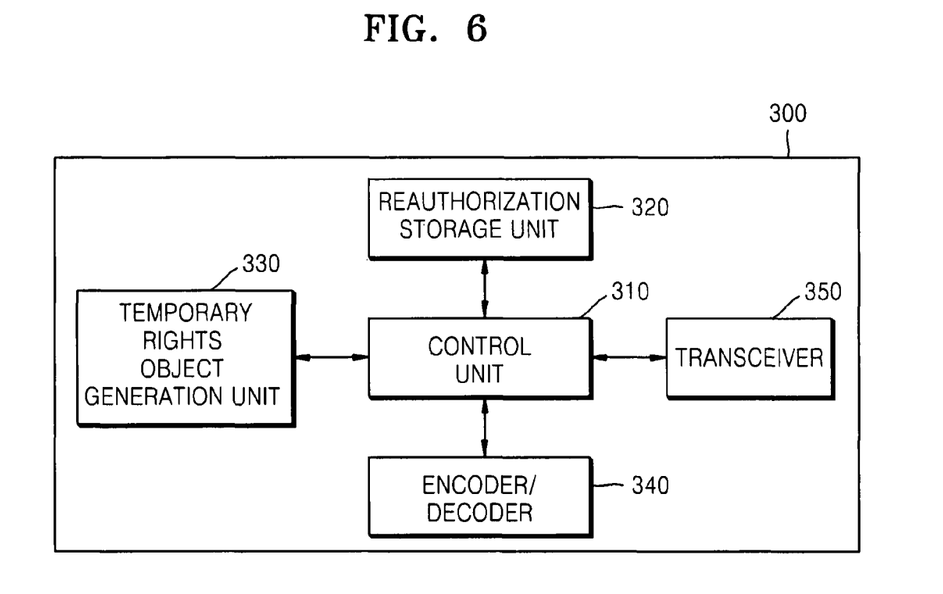
FIG. 6 is a diagram illustrating a first device according to an exemplary embodiment of the present invention.

FIG. 6 is a diagram illustrating the first device 300 according to an exemplary embodiment of the present invention. As shown in FIG. 6, the first device 300 includes a control unit 310, a reauthorization storage unit 320, a temporary RO generation unit 330, an encoder/decoder 340, and a transceiver 360.

The control unit 310 performs authentication on the representative device 200 and manages the second RO received from the representative device 200.

That is, by verifying the proxy certificate 222 received from the representative device 200, the validity of public keys e and N of the representative device 200 is checked, and the validity of the reauthorization key v is verified as follows.

$$v^e h(w, SN\_\text{first device}) = 1 \bmod N \qquad [\text{EQN. 2}]$$

When the reauthorization key is determined to be valid, the reauthorization storage unit 320 stores the received reauthorization key v and the warranty w.

The temporary RO generation unit 330 generates the newly signed temporary RO, using the authorization information received from the representative device 200, so that other devices can use the RO. Here, the temporary RO is an RO transmitted to a device outside the home domain, and has a small authorization range compared to the second RO.

That is, the first device 300 generates the temporary RO through the temporary RO generation unit 330 in order to share content with the second device 400, which is an external device not included in the home domain.

The encoder/decoder 340 provides a function of encrypting the RO to the temporary RO generation unit 330.

The transceiver 350 exchanges information with the representative device 200 or transmits the temporary RO to an unauthorized device (the second device 400 in the current exemplary embodiment).

Figure 7:
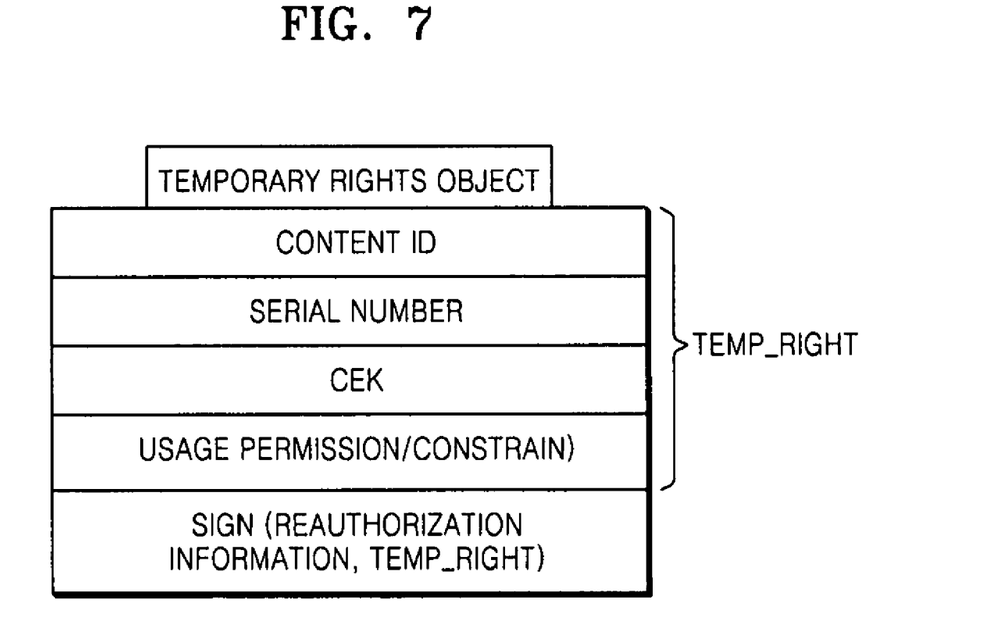
FIG. 7 is a diagram illustrating a temporary RO generated in a first device according to an exemplary embodiment of the present invention.

FIG. 7 is a diagram illustrating the temporary RO generated in the first device 300 according to an exemplary embodiment of the present invention.

As shown in FIG. 7, the temporary RO is formed of temporary right information Temp_Right and a reauthorization proxy signature Sign.

The temporary right information Temp_Right is license information signifying permission and constraint for using content, and includes a content identifier (ID), a serial number of a RO issuer, a content encryption key (CEK), and usage permission/constraint.

The reauthorization proxy signature Sign is a signature on the reauthorization about subordinate devices, which signs the temporary right information Temp_Right as the authorization information.

First, as shown in FIG. 7, the RO, generated in the first device 300, is signed with a private key of the first device 300 and is transmitted to the second device 400.

Upon receiving the RO, the second device 400 authorizes and uses the RO using its own public key.

At this time, the first device 300 prepares the temporary right information Temp-Right signifying a temporary usage permission, and signs the temporary right information Temp_Right with a reauthorization key, transmitted from the representative device 200 and stored in the reauthorization storage unit 320. Here, a detailed algorithm is calculating k=h (Temp_Right, r), $y = tv^k \bmod N$ to $\forall t \in [1, N]$, $r = t^e \bmod N$.

At this time, an ID of an unauthorized device (the second device 400 in the current exemplary embodiment), receiving the temporary RO, may be added.

Figure 8:
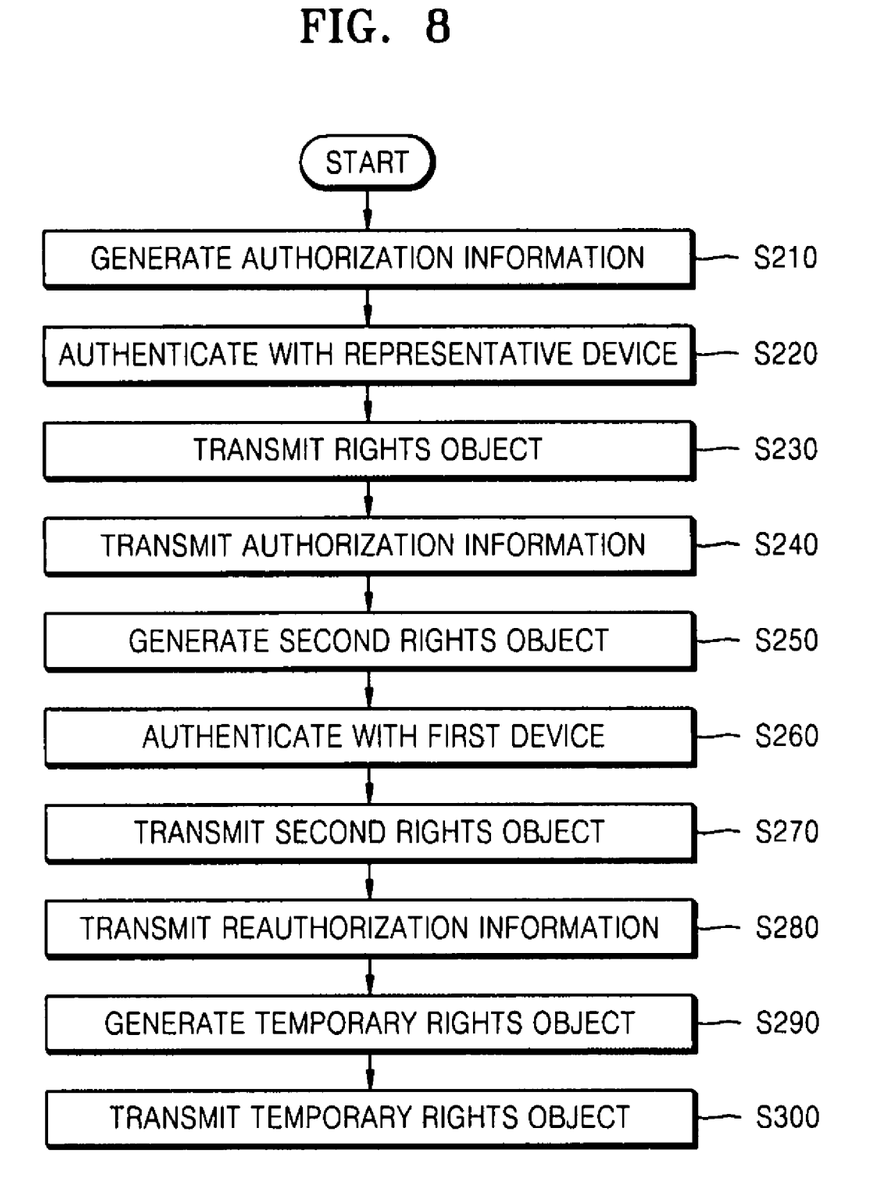
FIG. 8 is a flowchart illustrating a process of registering a device and generating a temporary RO according to an exemplary embodiment of the present invention.

FIG. 8 is a flowchart illustrating a process of registering a device and generating a temporary RO according to an exemplary embodiment of the present invention.

First, the RI 100 generates authorization information in operation S210. The authorization information is later transmitted to the representative device 200 so that the representative device 200 can generate a second RO. In order to generate the authorization information, a process of generating a random number and calculating a signature key is performed. After generating the authorization information, the representative device 200 is authenticated in operation S220. The representative device 200 is a device which can transmit the second RO to another device. The representative device 200 can be authenticated by using ID information of the representative device 200.

After the authentication of the representative device 200, the RI 100, transmits an RO to the representative device 200 in operation S230. The transmitted RO may be an RO required for using content already stored in the representative device 200, or an RO required for using content directly transmitted from the content provider 150.

An example of the RO which is to be transmitted from the RI 100 to the representative device 200 in operation S230 may include the following:

content ID||$E$(REK, CEK)||$E$(Device_prv key, REK)|| Rights||Sign(RI)||Sign(RI, (R||K))

Here, contentID is a content identifier, REK is an RO encryption key and CEK is a content encryption key. Device_prv key is a private key of the representative device 200, and REK is encrypted using the private key. Also, Rights is the RO, Sign(RI) is a signature, and Sign(RI, R(||K)) is a verification value on the signature.

As described above, the second RO is transmitted after an encryption using a private key generated during the authentication or a predetermined private key.

The RI 100 transmits the authorization information to the representative device 200 in operation S240. As described above, the authorization information includes signature information required for generating a new RO. Upon receiving the RO and the authorization information, the representative device 200 generates the second RO in operation S250. The second RO is generated using key information in the authorization information. At this time, usage rule information about an authorization signature key is provided together.

After generating reauthorization information using the same process as described above, the first device 300 is authenticated in operation S260. Also, the generated second RO is transmitted to the first device 300 in operation S270. The first device 300 can use the content using the second RO.

Here, an example of transmitting the second RO, after signing the second RO using the authorization signature, to the first device 300 includes the following:

content ID||$E$(REK, CEK)||$E$(Device 1_prv key, REK)|| Rights||Authorization Signature||Authorization Signature Verification Value (R, K)||Re-provider ID Device 1_prv key is a private key of the first device 300, and the first device 300 receives the second RO by Authorization Signature. An Authorization Signature and Authorization Signature Verification Value are generated in operation S210, using authorization signature information transmitted in operation S240.

After operation S270, the first device 300, upon receiving the second RO, determines validity of the authorization signature using a public key of the RI 100.

When the representative device 200 re-provides the obtained second RO to the first device 300, the authorization signature information and signed verification value information, included in the second RO which is to be re-provided, are required. Accordingly, the representative device 200 can only re-provide information permitted by the RI 100.

The representative device 200 transmits the reauthorization information to the first device 300 in operation S280. As described above, the reauthorization information includes signature information required for generating a new RO. Upon receiving the RO and the reauthorization information, the first device 300 generates a temporary RO in operation S290. The temporary RO is generated using key information in the reauthorization information. At this time, usage rule information about a reauthorization signature key is provided together.

Then, the generated temporary RO is transmitted to a second device 400, which is an external device, in operation S300. Accordingly, the second device 400 can use the content using the temporary RO.

An example of transmitting the temporary RO, after signing the temporary RO using the authorization signature, in operation S300 includes the following:

content ID||$E$(REK, CEK)||$E$(Device 2_prv key, REK)|| Rights||Reauthorization Signature||Reauthorization Signature Verification Value (R, K)||Re-provider ID Device 2_prv key is a private key of the second device 400, and the second device 400 receives the temporary RO by Reauthorization Signature. A Reauthorization Signature and Reauthorization Signature Verification Value are formed using the transmitted reauthorization information.

After operation S300, the second device 400, upon receiving the temporary RO, determines validity of the authorization signature using the public key of the first device 300.

When the first device 300 re-provides the obtained second RO to the second device 400, the reauthorization signature information and signed verification value information, included in the temporary RO which is to be re-provided, are required. Accordingly, the first device 300 can only re-provide information permitted by the representative device 200.

According to the current exemplary embodiment of the present invention, content bought by a user can be freely transmitted between various devices without violating a right of the content provider 150, and without an intervention of the RI 100 and the representative device 200.

That is, the representative device 200 receives the content from the content provider 150 and the RO on the content from the RI 100.

Also, when the first device 300, included in the same domain, requests to transmit the content, the representative device 200 transmits the content to the first device 300, and at the same time, transmits the reauthorization information.

That is, when the second device 400, not included in the same domain, requests a RO owned by the first device 300, in order to use the content, the first device 300 performs operations which allows the second device 400 to use the RO.

Accordingly, the representative device 200 receives the authorization information from the RI 100. The authorization information includes information which allows the representative device 200 to substitutively sign on the content directly. The representative device 200 signs the RO, signed with a key of the RI 100, using the authorization information of the representative device 200, and generates the second RO. Upon receiving the newly generated second RO, the first device 300 also receives the reauthorization information from the representative device 200. The first device prepares the temporary RO and generates a signature using the reauthorization information. Also, the first device 300 transmits the temporary RO to the second device 400, which is an external device.

At this time, since the second device 400 does not undergo processes of directly receiving a key from the RI 100 or the representative device 200 in order to use the temporary RO, an overhead caused by authentication can be reduced.

Figure 9:
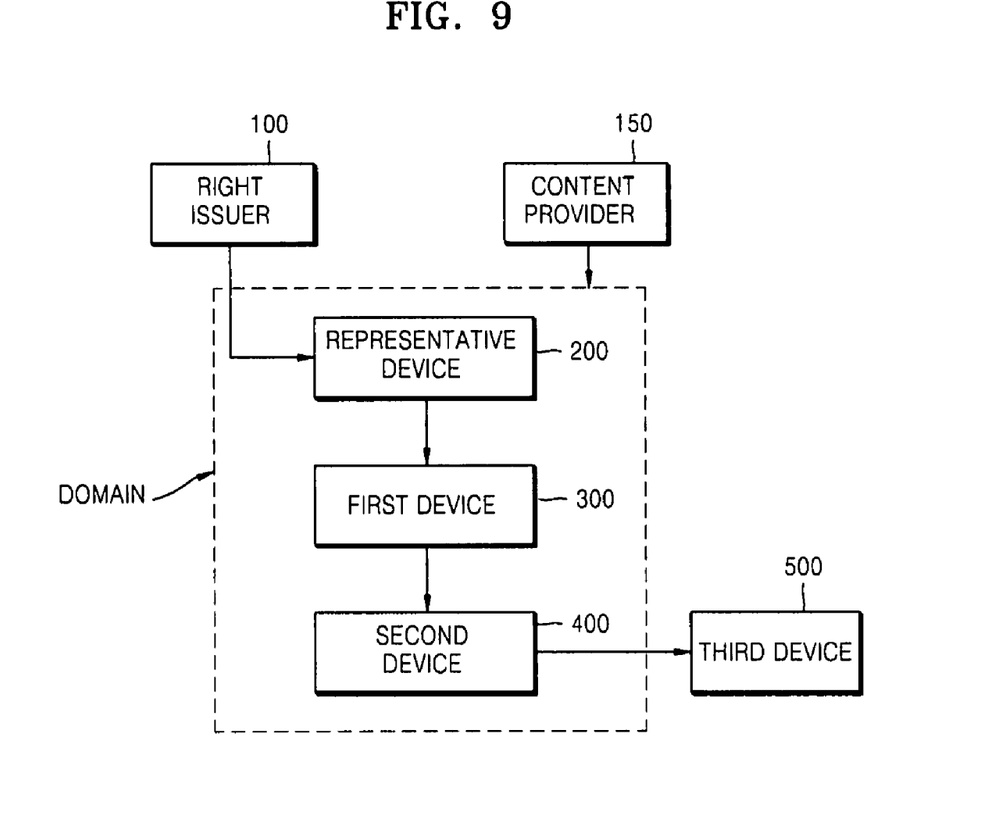
FIG. 9 is a diagram illustrating a generation of an RO according to another exemplary embodiment of the present invention.

FIG. 9 is a diagram illustrating the generation of an RO according to another exemplary embodiment of the present invention. The rights issuer 100 and the representative device 200 perform authentication mutually. After the authentication, the representative device 200 receives the RO and the authorization information from the RI 100. Then, the first device 300, included in the same domain as the representative device 200, receives the second RO from the representative device 200 by means of the authentication from the representative device 200, and receives the reauthorization information. Similarly, the second device 400, included in the same domain as the first device 300, receives a third RO from the first device 300 by means of the authentication from the first device 300, and receives the reauthorization information. Next, a third device 500, not included in the same domain as the second device 400, receives the temporary RO from the second device 400 by means of the authentication from the second device 400, and receives the reauthorization information.

As shown in FIG. 9, the third device 500, which is not included in the same domain, does not directly receive the temporary RO from the representative device 200, but can receive the temporary RO from the second device 400, which receives the reauthorization information by means of the representative device 200 and the first device 300.

Accordingly, consent of the RI 100 can be confirmed without an interaction between the RI 100 and the representative device 200, and thus content can be used without damaging profits of the content provider 150.

At this time, a device (not shown), included in the same domain as the second device 400, can be connected between the second device 400 and the third device 500 in the form of a chain in order to transmit the RO from the RI 100 to the third device 500.

The method of generating the RO by reauthorization according to the exemplary embodiment of the present invention can be written as a computer program. Codes and code segments for accomplishing the exemplary embodiment of the present invention can be easily construed by programmers of ordinary skill in the art to which the present invention pertains. The computer program is stored in computer readable medium, and the method of generating the RO by reauthorization can be embodied by reading and executing the computer readable medium in a computer. Examples of the computer readable medium include magnetic recording medium, optical recording medium, and carrier wave medium.

According to the exemplary embodiment of the present invention, by reauthorizing a RI with a right to generate an RO between devices connected in the form of a chain, content can be shared by a device not included in the same domain as the right issuer. Accordingly, the content can be shared without an intervention of the RI or a representative device, and can be used without damaging profits of a content provider.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of generating a rights object (RO) by reauthorization in a first device, the method comprising:
receiving one RO from a representative device, the representative device creating the one RO by using an authorization information received from a right issuer, the right issuer, the representative device and the first device being included in a domain,
receiving a reauthorization information from the representative device, the reauthorization information reauthorizing the first device to generate a temporary RO,
changing the one RO to the temporary RO using the reauthorization information, and
transmitting the temporary RO to an unauthorized device, the unauthorized device being not included in the domain.

2. The method of claim 1, further comprising transmitting content to the unauthorized device, wherein the unauthorized device uses the content by using the temporary RO.

3. The method of claim 1, wherein the temporary RO comprises an identifier of the unauthorized device.

4. The method of claim 1, wherein a right recorded in the reauthorization information is included in a right recorded in the authorization information.

5. An apparatus for generating a rights object (RO) by reauthorization, the apparatus comprising:
a control unit which manages one RO received from a representative device, the representative device creating the one RO by using an authorization information received from a right issuer, the right issuer, the representative device and the apparatus being included in a domain;
a reauthorization storage unit which stores a reauthorization information received from the representative device, the reauthorization information reauthorizing the apparatus to generate a temporary RO;
a rights object generation unit which changes the one RO to the temporary RO using the reauthorization information; and
a transceiver which transmits the temporary RO to an unauthorized device, the unauthorized device being not included in the domain.

6. The apparatus of claim 5, wherein the temporary RO comprises an identifier of the unauthorized device.

7. The apparatus of claim 5, wherein a right recorded in the reauthorization information is included in a right recorded in the authorization information.

8. A non-transitory computer readable recording medium having recorded thereon a program for executing a method of generating a rights object (RO) by reauthorization in a first device, the method comprising:
receiving one RO from a representative device, the representative device creating the one RO by using an authorization information received from a right issuer, the right issuer, the representative device and the first device being included in a domain;
receiving a reauthorization information from the representative device, the reauthorization information reauthorizing the first device to generate a temporary RO;
changing the one RO to the temporary RO using the reauthorization information; and
transmitting the temporary RO to an unauthorized device, the unauthorized device being not included in the domain.

* * * * *